United States Patent [19]
Koizumi et al.

[11] Patent Number: 5,128,818
[45] Date of Patent: Jul. 7, 1992

[54] STABLE DISC UNIT HAVING REDUCED THICKNESS

[75] Inventors: Shigeki Koizumi, Yokoze; Hiroshi Oka, Chichibu, both of Japan

[73] Assignee: Canon Denshi Kabushiki Kaisha, Chichibu, Japan

[21] Appl. No.: 466,010

[22] Filed: Jan. 16, 1990

[30] Foreign Application Priority Data

| Jan. 17, 1989 | [JP] | Japan | 1-009239 |
| Jan. 17, 1989 | [JP] | Japan | 1-009240 |
| Jan. 30, 1989 | [JP] | Japan | 1-017515 |
| Feb. 17, 1989 | [JP] | Japan | 1-036098 |

[51] Int. Cl.⁵ .................................. G11B 5/012
[52] U.S. Cl. ......................... 360/99.04; 360/99.12; 369/270
[58] Field of Search ............... 360/97.01, 99.01, 99.04, 360/99.05, 99.08–99.12; 369/270, 271

[56] References Cited

U.S. PATENT DOCUMENTS

| 4,737,870 | 4/1988 | Okita ........................ 360/99.08 |
| 4,831,474 | 5/1989 | Kumegai .................... 360/97.01 |
| 4,845,578 | 7/1989 | Kumagai .................... 360/97.01 |
| 4,874,976 | 10/1989 | Ohsawa et al. ............. 360/97.01 |

Primary Examiner—David J. Severin
Attorney, Agent, or Firm—Spencer, Frank & Schneider

[57] ABSTRACT

A disc drive unit for rotating a data storage disc such as an optical disc or a magnetic disc comprising a turntable for supporting and rotating the disc, and a motor for rotating the turntable. The turntable also functions as a rotor of the motor. At least one driving magnet is mounted on the turntable in opposing relationship with at least one coil of the motor. At least one attraction magnet for securely holding the disc in position on the turntable is securely mounted thereon. One yoke functions as yokes, each of which must be provided for each of two kinds of magnets. When the turntable is made of a plastic, at least one attraction magnet and/or at least one driving magnet is defined by partially magnetizing the turntable at at least one predetermined region thereof. The turntable is securely attached to the bearings so that it rotates about a shaft having one end securely fixed to a stationary portion of the motor. When rotating the disc, one of the bearings is used as a member for securely holding the disc in position on the turntable.

16 Claims, 10 Drawing Sheets

STABLE DISC UNIT HAVING REDUCED THICKNESS

BACKGROUND OF THE INVENTION

1. Field of the Invention

The present invention relates to a disc drive unit and a disc unit and more particularly a disc drive unit for rotating an optical disc, a magnetic disc or the like which is used as a recording medium in the data processing systems and a disc unit equipped with said disc drive unit and a read-write head for reading and writing data out of and onto the surface of a disc.

2. Description of the Prior Art

A conventional disc drive unit with the construction shown in FIG. 1 has been well known to those skilled in the art. A shaft 1 is supported by a pair of vertically spaced-apart bearings 2a and 2b which in turn are securely mounted on a base 3. A turntable 4 made of a nonmagnetic material is securely attached to the upper portion of the shaft 1 in coaxial relationship therewith. An annular recess 4a is defined at the upper surface of the turntable 4 coaxially thereof and a disc attraction magnet 6 is fitted through a yoke 5 into the recess 4a. Plate-like yokes 8 are securely attached to the undersurface of the turntable 4 with screws 7, and driving magnets 9, which constitute a disc driving motor, are securely attached to the undersurfaces of the yokes 8. Yokes 10 which establish magnetic circuits together with the yokes 8 are securely mounted on the base 3 in opposing relationship with the yokes 8, respectively. A driving coil 11, which is also a component part of the disc driving motor, is mounted on each yoke 10.

In the case of the disc drive unit with the above-described construction, a disc is mounted on the turntable 4 while the position of the center of the disc is determined by the shaft 1. When a suitable current is supplied to the coils 11, the magnetic circuits made of the coils 11 produces a rotating force so that the turntable 4 is caused to rotate about the shaft 1 relative to the base 3.

FIG. 2 illustrates the construction of another conventional disc drive unit incorporated in an optomagnetic type disc unit. The center portion of an optical disc 100, which is used as a recording medium, is increased in thickness as compared with the remaining portion to define a hub 100a, and a center hole 100b is defined at the center thereof. A magnetic plate 101 such as a plate of iron or the like is securely attached to the undersurface of the hub 100a.

The optical disc 100 which is mounted on the turntable 4 is rotated by a motor 60 through the turntable 4. The turntable 4 upon which the optical disc 100 is mounted is securely attached to the upper portion of the shaft 1 which in turn is rotated by the motor 60. A disc-shaped recess is formed at the upper surface of the turntable 4 and the plate-shaped disc attraction magnets 6 are mounted through the yokes 5 at the bottom of the disc-shaped recess.

The optical disc 100 is mounted on the turntable 4 by a loading mechanism (not shown) and is supported by the turntable 4. More particularly, the position of the optical disc 100 is determined when the shaft 1 is inserted into the center hole 100b, and the optical disc 100 is placed on a flange 4b which is defined by extending the peripheral portion of the turntable 4 radially, upwardly and obliquely, while the magnetic plate 101 is attracted by the magnet 6 so that the disc 100 is supported by the flange 4b.

Thus the optical disc 100 is rotated by the motor 60 while it is mounted on the turntable 4 in the manner described above. Then a read-write head 50 is displaced in the radial direction of the optical disc 100 so that data is written onto or read out off of the surface of the optical disc 100 by the optomagnetic recording system.

In response to the tendency for miniaturization and for facilitating the portability of data processing units such as microcomputers, wordprocessors and the like each incorporating a disc drive unit, there exists a strong demand for miniaturizing and especially decreasing the thickness in the direction perpendicular to the disc mounted an the disc drive units and the disc units equipped with the disc drive unit. Such miniaturization and reduction in thickness can be sometimes accomplished by a simple design of the component parts and a reduction in the number of such parts. The successful reduction in size of the disc driving units and disc units can attain the advantages that the costs can be decreased due to an increase in production efficiency. Also, a high degree of reliability in operation can be ensured.

Even in the conventional disc drive units and disc units, various countermeasures for the reduction in thickness have been devised and demonstrated. For instance, in the case of the disc drive unit as shown in FIG. 1, it is so designed and constructed that the turntable upon which the disc is mounted and which is rotated functions as part of the rotor of the disc driving motor, whereby the number of component parts to be assembled into the disc drive unit is decreased. It is furthermore proposed to shorten the distance between the vertically spaced-apart bearings used in the disc drive units shown in FIGS. 1 and 2 as much as possible while leaving a suitable air gap between the driving magnet and the coil mounted thereon. Moreover, it is proposed to construct the magnets 6, yokes 5 and turntable 4 into a unitary body; that is, to magnetize the turntable 4 in the constructions shown in FIGS. 1 and 2.

However, even when the turntable is so designed and constructed that it accomplishes the double function of the turntable and the rotor as described above, there still remains the possibility of decreasing the thickness of the disc driving unit. When the distance between the vertically spaced-apart bearings is shortened, oscillation of the shaft results so that the disc cannot rotate at a predetermined rotational speed. Furthermore, in the case of the magnetization of the turntable, there is a fear that magnetic particles separated from the disc may adhere to the flange of the turntable on which the disc is placed by the magnetic attraction force of the turntable. As a result, waving of the disc mounted on the flange results so that the correct read/write operation is adversely affected.

As described above, in the many conventional disc drive units and disc units, there still remains the possibility for reducing the thickness. Furthermore, even when suitable countermeasures are used so as to decrease the thickness of the disc drive units and disc units, adverse effects result due to the use of such countermeasures.

SUMMARY OF THE INVENTION

In view of the above, one of the objects of the present invention is to provide a disc drive unit and a disc unit both of which are so improved as to have reduced thickness.

Another object of the present invention is to provide a disc drive unit and a disc unit both of which avoid unstable disc driving resulting from the reduction in thickness so that the disc can be rotated at a correct predetermined rotational speed.

A further object of the present invention is to provide a disc drive unit and a disc unit each of which comprises a smaller number of component parts so that the disc drive unit and the disc unit can be made compact in size and light in weight, and can be assembled in a simple manner.

According to one aspect of the present invention, one yoke which constitutes the disc drive unit is used as a yoke for a plurality of magnets and a portion of a disc supporting member is magnetized so that it becomes possible not only to decrease a number of component parts of the disc drive unit but also to reduce the thickness thereof. According to another aspect of the present invention, the unstable driving of a disc resulting from the reduction in thickness of the disc drive unit can be avoided.

In one aspect, the present invention provides a disc drive unit for supporting and rotating a disc comprising:

a base member which is stationary with respect to the rotation of said disc;

a shaft securely attached to said base member;

at least one coil securely attached to said base member for surrounding said shaft;

a rotary member disposed to rotate about said shaft and having an engagement portion in engagement with a center hole formed through said disc when said disc is mounted on said rotary member and a supporting portion for supporting said disc mounted;

at least one attraction magnet mounted on one surface of said rotary member in opposing relationship with said disc; and at least one driving magnet mounted on the other surface of said rotary member in opposing relationship with said at least one coil, respectively, said disc being attracted and securely held in position by a magnetic force of said at least one attraction magnet and said rotary member being rotated by the interaction between a magnetic field produced by said at least one coil when a current is supplied to said at least one coil and a magnetic field produced by said at least one driving magnet.

In another aspect, the present invention provides a disc drive unit for supporting and rotating a disc comprising:

a base member which is stationary with respect to the rotation of said disc;

a shaft rotatably attached to said base member;

at least one coil securely mounted on said base member for surrounding said shaft;

a rotary member securely carried by said shaft and having a supporting portion for supporting said disc;

a yoke being a component part of said rotary member;

at least one attraction magnet mounted on one surface of said yoke in opposing relationship with said disc; and at least one driving magnet mounted on the other surface of said yoke in opposing relationship with said at least one coil, respectively, said disc being attracted and securely held in position by a magnetic force of said at least one attraction magnet and said rotary member being rotated by the interaction between a magnetic field produced by said at least one coil when a current is supplied to said at least one coil and a magnetic field produced by said at least one driving magnet.

In further aspect, the present invention provides a disc drive unit for supporting and rotating a disc comprising:

a base member which is stationary with respect to the rotation of said disc;

a shaft rotatably attached to said base member;

at least one coil securely mounted on said base member for surrounding said shaft;

a rotary member made of a plastic, being securely carried by said shaft and having a supporting portion for supporting said disc;

at least one attraction magnet region of said rotary member defined by partially magnetizing at least one region of one surface of said rotary member in opposing relationship with said disc; and at least one driving magnet region of said rotary member being defined by partially magnetizing at least one region on the other surface of said rotary member in opposing relationship with said at least one coil, said disc being attracted and securely held in position by a magnetic force of said at least one attraction magnet region and said rotary member being rotated by an interaction between a magnetic field produced by said at least one coil when a current is supplied to said at least one coil and a magnetic field produced by said at least one driving magnet region.

In further aspect, the present invention provides a disc drive unit for supporting and rotating a disc comprising:

a base member which is stationary with respect to the rotation of said disc;

a shaft rotatably attached to said base member;

at least one coil securely mounted on said base member for surrounding said shaft;

a rotary member made of a plastic securely carried by said shaft and having a supporting portion for supporting said disc;

at least one attraction magnet region of said rotary member defined by partially magnetizing at least one region of one surface of said rotary member in opposing relationship with said disc; and at least one driving magnet mounted on the other surface of said rotary member in opposing relationship with said at least one coil, said disc being attracted and securely held in position by a magnetic force of said at least one attraction magnet region and said rotary member being rotated by an interaction between a magnetic field produced by said at least one coil when a current is supplied to said at least one coil and a magnetic field produced by said at least one driving magnet.

In a further aspect, the present invention provides a disc unit equipped with a disc drive unit of the type described above.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
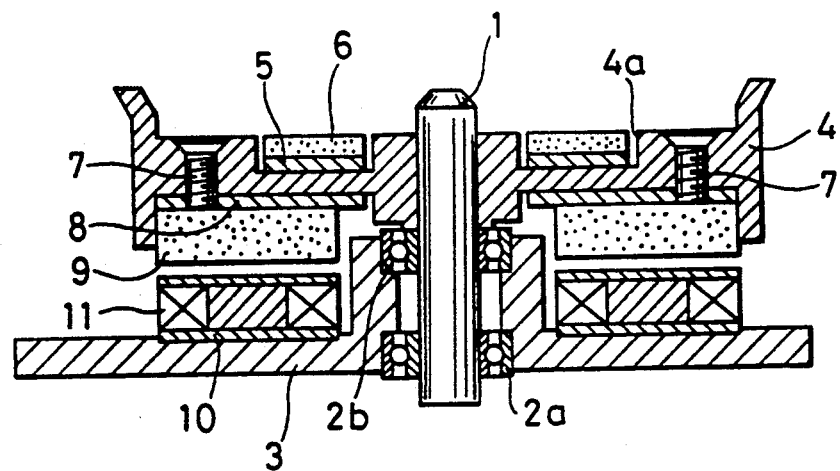
FIG. 1 is a sectional view illustrating a conventional disc drive unit.
Figure 5:
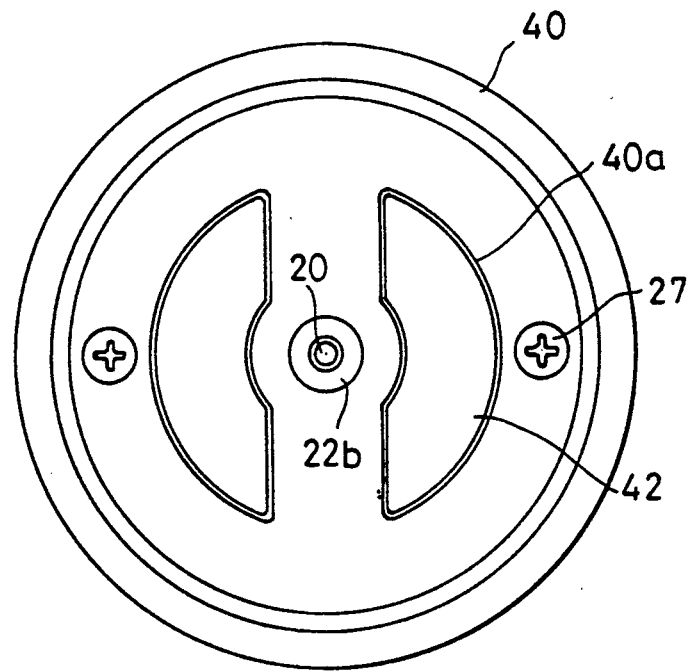
FIG. 5 is a partial top view of the modification shown in FIG. 4.
Figure 2:
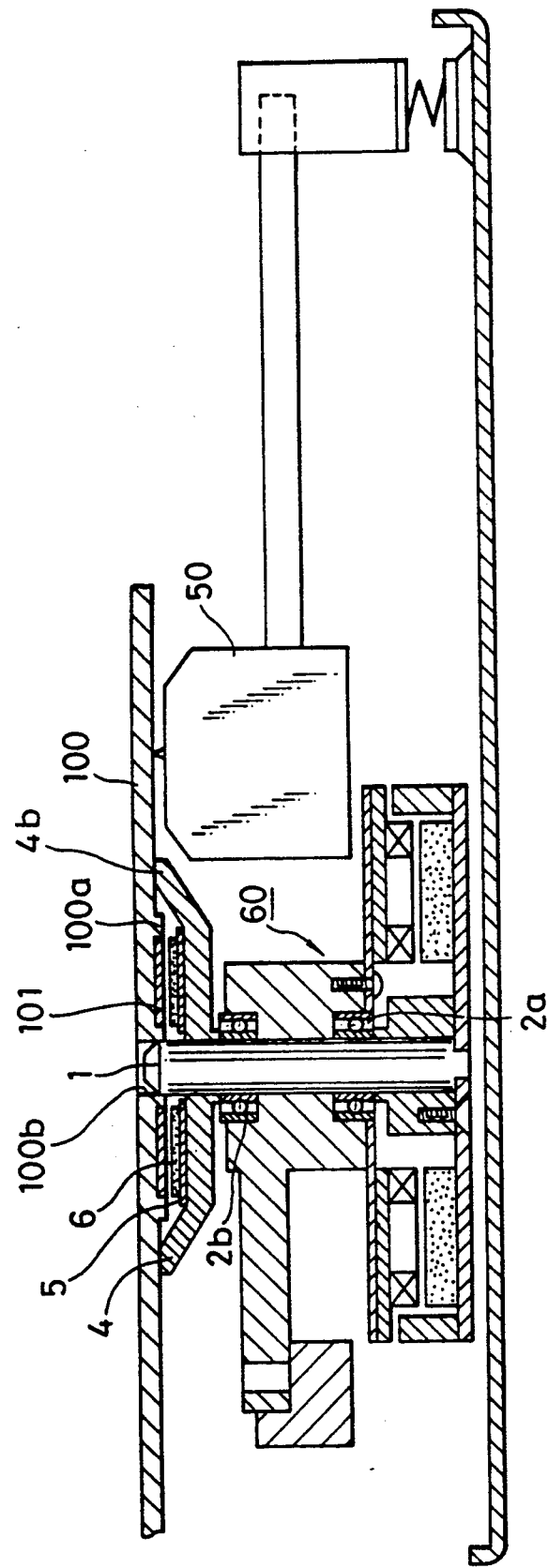
FIG. 2 is a sectional view illustrating another conventional disc unit.
Figure 3:
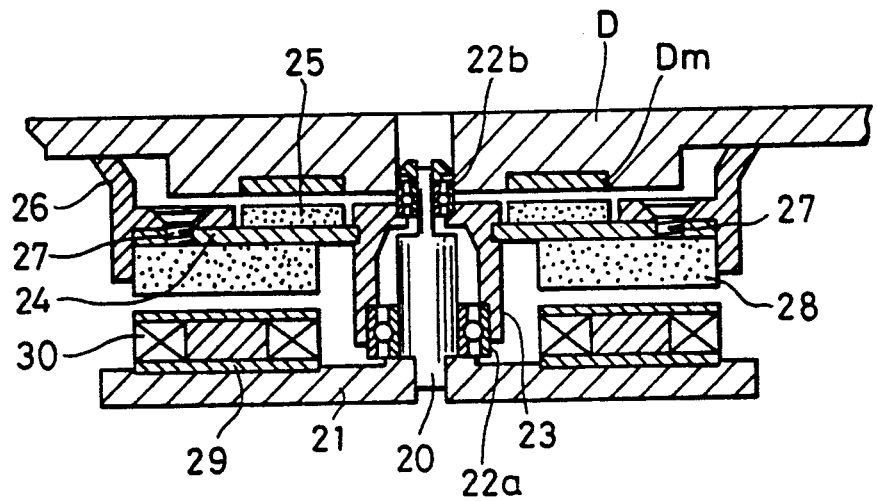
FIG. 3 is a sectional view of an embodiment of a disc drive unit in accordance with the present invention.
Figure 4:
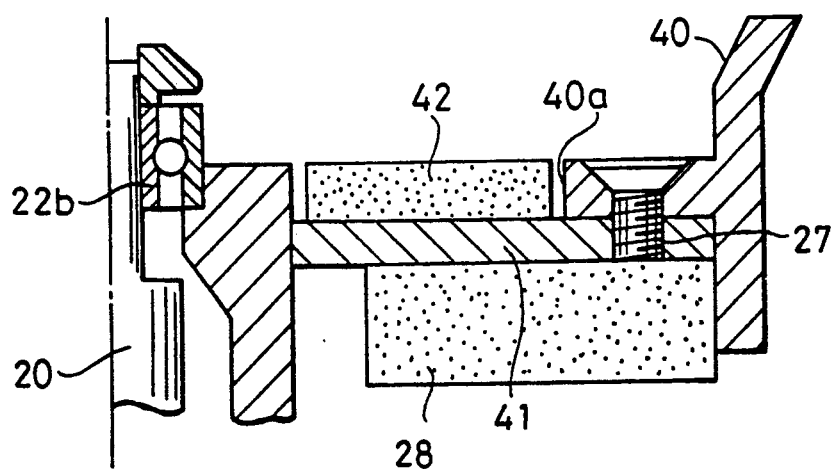
FIG. 4 is a sectional view illustrating a part of a disc drive unit and a modification of the structure for attaching the turntable shown in FIG. 3.

First Embodiment, FIGS. 3-5

Referring first to FIG. 3, the lower end of a shaft 20 is securely attached to a base 21 and a hub 23 rotatably surrounds the shaft 20 through a pair of vertically spaced-apart bearings 22a and 22b. A disc-shaped rotor yoke 24 made of magnetic substance such as iron or the like is securely carried by the hub 23, and attraction magnets 25 are mounted and securely maintained in position by their own magnetic force over the upper surface of the yoke 24 in such a way that the magnets 25 coaxially surrounds the hub 23. A turntable 26 made of aluminum is securely attached to the rotary yoke 24 with screws 27 in such a way that it coaxially surrounds the attraction magnets 25. Thus the turntable 26 serves as a supporting member for supporting a disc thereon. Driving magnets 28, which constitute a disc driving motor together with other component parts, are securely attached to the undersurface of the rotor yoke 24. Yokes 29, which establish magnetic circuits together with the rotor yoke 24 are securely mounted on the base 21 in opposing relationship with the driving magnets 28. A coil 30 is mounted on each yoke 29.

In the first embodiment with the above-described construction, a disc D is placed on a flange defined by extending the peripheral portion of the turntable 26 radially outwardly, upwardly and obliquely while the position of the center of the disc D is defined by the outer cylindrical surface of the upper bearing 22b. Attracted plates Dm made of a magnetic substance are securely attached to the undersurface of the disc D so that the disc D is attracted by the attraction magnet 25 and is securely supported in position. While the disc D is mounted on the turntable 26 in the manner described above, a current having a suitable value is supplied to the coils 30 so that as a result of the interaction between the magnetic circuit established by the rotor yoke 24 and the driving magnets 28 on the one hand and the magnetic circuit established by the yokes 29 and the coils 30 mounted thereon on the other hand, a rotating force is produced to rotate the disc D supported by the turntable 26. In this case, the lower end of the shaft 20 is securely attached to the base 21 so that the component parts which are actually rotated are the bearings 22a and 22b, the hub 23 attached thereto and the rotor yoke 24. It follows therefore that the shaft 20 remains stationary and the position of the disc D is defined by the cylindrical outer surface of the upper bearing 22b so that oscillation of the shaft 20 due to the rotation of the disc D does not occur, whereby stable rotation of the disc D can be ensured.

The rotor yoke 24 securely holds the driving magnets 28 and the attraction magnets 25. In this manner, the rotor yoke 24 also function as yokes for the attraction magnets 25 and the driving magnets 28. As a result, the reduction in number of component parts and a reduction in the thickness of the disc drive unit can be realized. Furthermore, the attraction magnets 25 are directly and securely attached to the rotor yoke 24 by the magnetic attraction force which is considerably stronger than the attraction force between the disc D and the attracted plates Dm so that the assembly of the disc drive unit can be facilitated especially because the bonding processes can be eliminated.

FIG. 4 is a partial sectional view of a modification of the turntable shown in FIG. 3 and FIG. 5 is a top view thereof. Same reference numerals are used to designate similar parts throughout FIGS. 3, 4 and 5. As best shown in FIG. 5, the turntable 40 is formed with an opening 40a and is directly and securely attached to the bearings 22a and 22b. The rotary yoke 41 is securely attached to the undersurface of the turntable 40 with screws 27 and the driving magnets 28 are securely attached to the undersurface of the rotor yoke 41. In addition, the attraction magnets 42 are securely attached to the portion of the rotor yoke 41 exposed through the opening 40a by its own magnetic force.

In the case of such modification, the hub can be eliminated and the turntable can be constructed as a unitary body so that the assembly efficiency can be much facilitated without adversely affecting the effects attained by the first embodiment described above.

Figure 6:
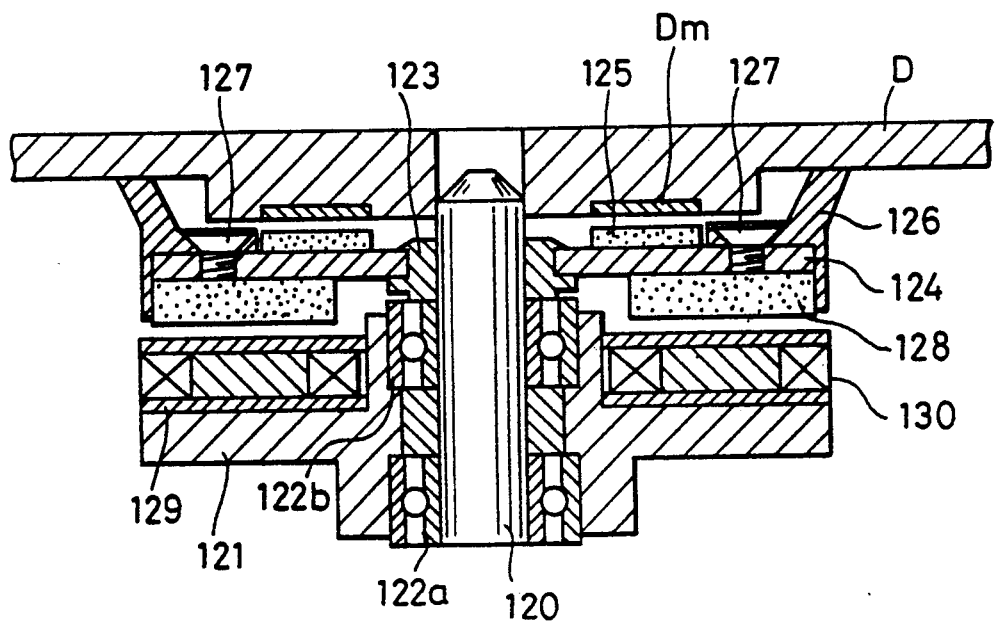
FIG. 6 is a sectional view illustrating another embodiment of a disc drive unit in accordance with the present invention.

Second Embodiment, FIG. 6

FIG. 6 illustrates a second embodiment of a disc drive unit in accordance with the present invention. In FIG. 6, a shaft 120 is rotatably extended upwardly from a base 121 through a pair of vertically spaced-apart bearings 122a and 122b, and a hub 123 is securely fitted over the upper portion in the vicinity of the upper end of the shaft 120. A disc-shaped rotor yoke 124 made of a magnetic material is securely attached around the hub 123 and attraction magnets 125 are mounted upon the upper surface of the rotor yoke 124 in such a way that they surround the hub 123 coaxially thereof. A turntable 126 is securely attached to the rotor yoke 124 with screws 127 in such a way that it surrounds the attraction magnets 125 coaxially thereof. Driving magnets 128 are securely mounted on the undersurface of the rotor yoke 124 and yokes 129 are securely mounted on the base 121 in opposing relationship with the driving magnets 128, respectively. Coils 130 is mounted on each yoke 129.

In the case of the second embodiment with the above-described construction, a disc D is placed on a peripheral flange of the turntable 126 extended radially outwardly, upwardly and obliquely while the position of the center of the disc D is determined by the outer cylindrical surface of the shaft 120. While attracted plates Dm made of a magnetic material are securely attached to the undersurface of the disc D so that the disc D is attracted and securely held in position on the turntable 126 by the attraction magnets 125.

In the second embodiment, the rotor yoke 124 holds the driving magnets 128 as well as the attraction magnets 125. That is, the rotor yoke 124 also functions as yokes for the attraction and driving magnets 125 and 128 so that it is not needed to provide a yoke for each of the attraction and driving magnets 125 and 128. Therefore, the number of component parts of the second embodiment can be decreased and furthermore it becomes possible to reduce the thickness of the turntable 126 by the thickness of one yoke as compared with the conventional turntables. As a result, the reduction in thickness of the disc drive unit can be realized. The attraction magnets 125 are directly and securely attached to the rotor yoke 124 by the magnetic attraction force which is considerably stronger than the attraction force produced between the attraction magnets 125 and the attracted plates Dm of the disc D so that the bonding processes or the like can be eliminated in assembly and therefore productivity can be increased.

In the second embodiment, the shaft 120 is rotatable unlike the stationary shaft 20 described above in the first embodiment and when the bearings 122a and 122b are fitted with a high degree of accuracy without eliminating play between them as much as possible, it becomes possible to maintain the oscillation of the shaft 120 resulting from the rotation of the disc D within a predetermined tolerable range.

Figure 7:
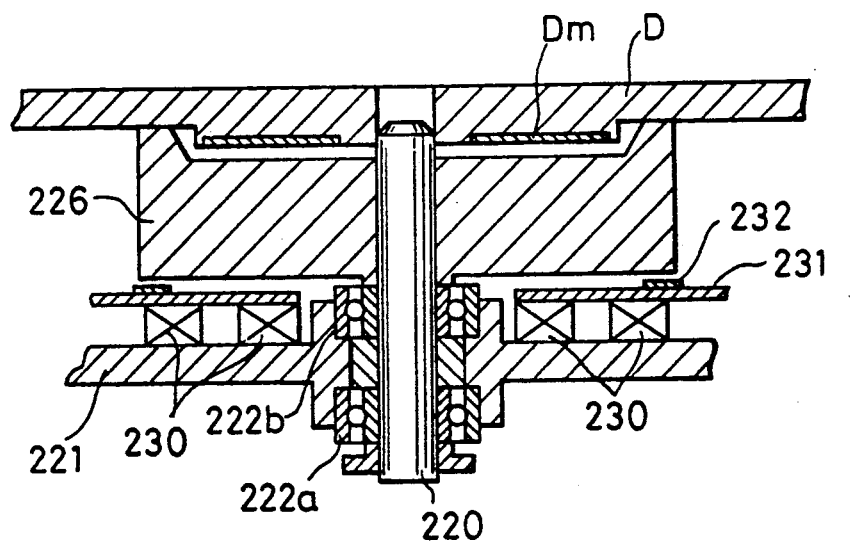
FIG. 7 is a sectional view of a further embodiment of a disc drive unit in accordance with the present invention.
Figure 8:
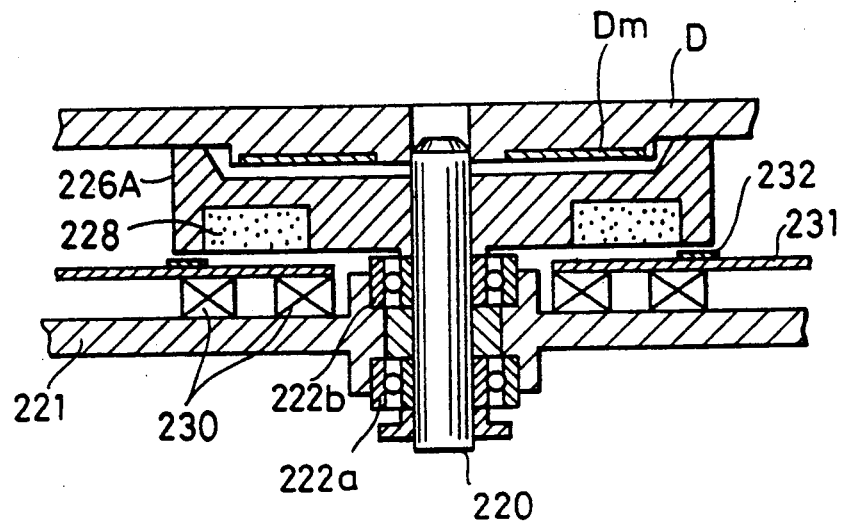
FIG. 8 is a sectional view illustrating a modification of the turntable shown in FIG. 7.
Figure 9:
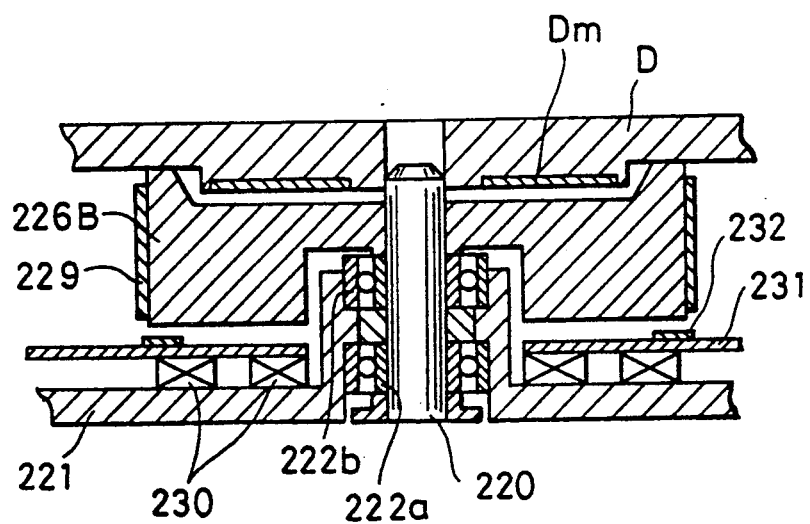
FIG. 9 is a sectional view illustrating another modification of the turntable shown in FIG. 7.

Third Embodiment, FIGS. 7, 8 and 9

Referring first to FIG. 7, a turntable 226 made of a plastic magnet material has portions which are in opposing relationship with coils 230 and are magnetized so that the turntable 226 is rotated in response to the interactions between the magnetic circuits established by the magnetized portions of the turntable 226 and the coils 230. In the case of the rotation of the turntable 226, a shaft 220 to which the turntable 226 is securely attached on the upper portion is supported by the bearings 222a and 222b. A portion of the turntable 226 in opposing relationship to a pattern 232 of a frequency generator (FG) disposed on a printed-circuit board 231 are also magnetized. The portions on the upper surface of the turntable 226 in opposing relationship with the attracted plates Dm of the disc D are further magnetized to produce attraction forces so that the disc D is attracted by and securely held in position on the turntable 226.

As described above, when a plastic magnetic material is used to form the turntable 226, portions of the turntable 226 can be magnetized for the driving magnets, the attraction magnets and the FG magnets so that the degree of freedom in designing the turntable is increased and a reduction in number of component parts can be attained, thereby reducing the cost. Furthermore, since the total weight of the rotating component parts can be made low, a disc drive unit with excellent starting characteristic can be obtained. In addition, by adjusting the thickness of the turntable, the reduction in thickness of the disc drive unit can be accomplished in a simple manner.

First Modification of Third Embodiment, FIG. 8

Referring next to FIG. 8, a first modification of the third embodiment will be described. In order to design and construct a high-torque, ultra-thin type motor for a disc drive unit, driving magnets exhibiting excellent magnetic characteristics are required. It follows therefore when the magnetization of the predetermined portions of the turntable 226 made of a plastic magnet as shown in FIG. 7 is not satisfactory, magnets 228 having a excellent of magnetic characteristics are attached to a turntable 226A in opposing relationship with the coils 230, whereby a high-torque, ultra-thin disc driving motor can be obtained. In this case, when the predetermined portions of the turntable 226 made of a plastic magnet is magnetized for the attraction magnets, it is not necessary to attach the attraction magnets so that a reduction not only in the number of component parts but also in thickness can be realized.

Second Modification of Third Embodiment, FIG. 9

FIG. 9 illustrates a second modification of the third embodiment shown in FIG. 7. In this modification, a high degree of workability of the plastic magnet is so utilized that the bearings 222a and 222b are disposed within a turntable 226B, whereby the thickness of the disc drive unit can be also reduced. Furthermore, a yoke 229 is formed integral with the outer periphery of the turntable 226B in order to increase the magnetic flux density. Thus, the peripheral equipment is prevented from being adversely affected by the magnetic flux.

First Embodiment of Optomagnetic Disc Unit, FIGS. 10-16

Figure 10:
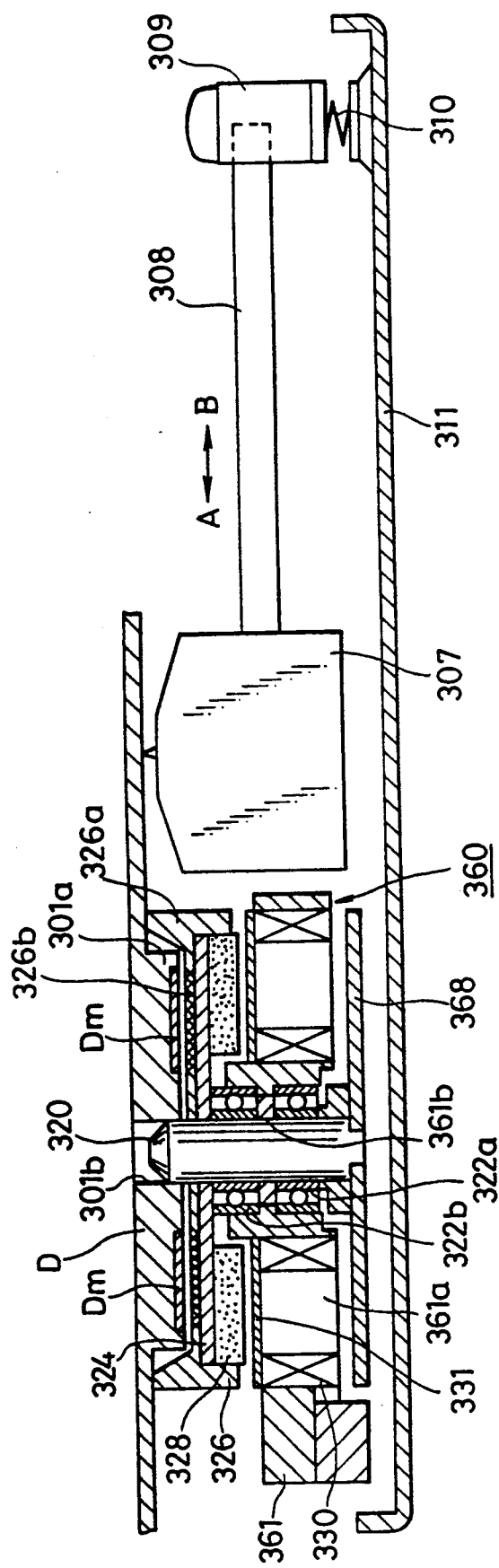
FIG. 10 is a sectional view of an embodiment of a disc unit in accordance with the present invention constructed by the assembly of a further embodiment of a disc drive unit with a read-write head.
Figure 11:
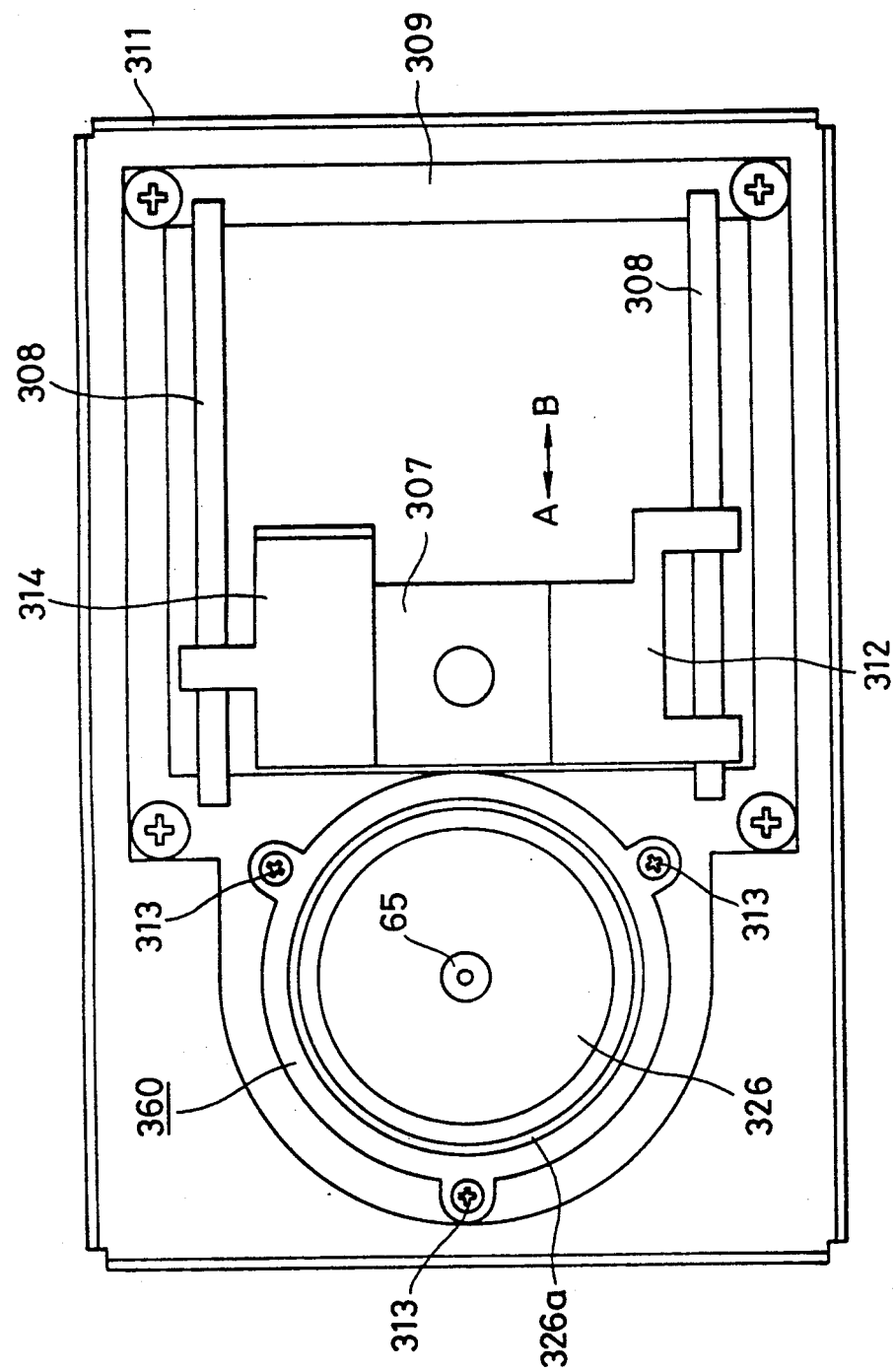
FIG. 11 is a plan view of the disc unit shown in FIG. 10.

Referring first to FIGS. 10 and 11, a first embodiment of an optomagnetic disc unit will be described.

In FIGS. 10 and 11, the component parts of the unit are disposed in and supported by a bottom plate 311. A frame-shaped base 309 for supporting a driving mechanism of the unit is supported by the bottom plate 311 through a damper spring 310 in a floating manner. Two guide bars 308 are extended in parallel with each other over the base 309 and a head carriage 312 is mounted on the guide bars 308 in such a way that it is slidably reciprocated in the direction of the axes of guide bars 308 as indicated by the double-pointed arrow A-B. Mounted on the head carriage 312 is an optical head 307 which is a transducer for writing and reading data onto and off of the surface of an optical disc D based on the optomagnetic recording system. Mounted on the head carriage 312 is a linear motor 314 for driving the head carriage 312.

A motor 360 for rotating the optical disc D is mounted on the base 309 and is of the double rotor type in which the exciting coils are securely held in position and which comprises the following component parts 361-368. A housing 361 for securely holding the exciting coils 330 in position is securely attached on the base 309 with screws 313. The housing 361 is defined in the form of a circle when viewed from the top and has predetermined holes 361a in equally angularly spaced apart relationship with each other in the circumferential direction. Each exciting coil 330 (to be referred to as "the coil" in this specification hereinafter) is embedded in each hole 361a. The thickness of the housing 361 is equal to the height of the coils 330 so that both the upper and lower surfaces of the housing 361 are coplanar with the upper and lower ends of the coils 330. A printed-circuit board 331 having a wiring pattern for connection with the ends of the coil 330 and a pattern providing frequency generators (FG) for detecting the rotational speed is mounted on each coil 330. A hole 361b is vertically extended through the housing 361 at the center thereof and rotably receives therein through a pair of vertically spaced apart bearings 322a and 322b a shaft 320 which is the output shaft of the motor 360. The upper and lower ends of the shaft 320 are extended upwardly and downwardly, respectively, out of the housing 361 and a turntable 326 to be described in detail hereinafter is securely held in position by the upwardly extended end of the shaft 320. A rotor yoke 324 (to be referred to as "the rotor" hereinafter in this specification) is securely attached to the undersurface of the turntable 326 by the insert formation process. Magnets 328 are securely attached to the undersurface of the rotor 324 and are spaced apart from the opposing coils 330 by a small air gap and the printed-circuit board 331. An auxiliary rotor yoke 368 (to be also referred as "the rotor" hereinafter in this specification) is securely attached to the lower end of the shaft 320 and is spaced apart from the opposing coils 330 by an air gap. When the current flows through the coils 330 of the motor 360 with the above-described construction so that the coils 330 are excited by a predetermined excitation system, due to the attraction or repelling forces interacting between the coils 330 and the magnets 328, the magnets 328 are rotated so that the rotors 324 and 368 and the shaft 320 securely attached thereto are rotated.

The disc-shaped turntable 326 which is a supporting member upon which the optical disc D is mounted is securely attached to the upwardly extended upper end of the shaft 320. The diameter of the turntable 326 is greater than that of a hub 301a of the optical disc D and a ring-shaped projection 326a (to be also referred as "the flange" hereinafter in this specification) is upwardly extended from the periphery of the upper surface of the turntable 326. The rotor 324 upon which are mounted the above-described magnets 328 is attached to the undersurface of the turntable 326.

In this embodiment, the turntable 326 is integrally formed from the so-called plastic magnet which is made by mixing magnetic particles into a resin and magnetizing them. It should be noted that the regions of the turntable 326 which are made by mixing the magnetic particles and magnetizing them are only the hatched regions 326b; that is, the regions substantially in opposing relationship with attracted plates Dm which are made of a magnetic material and are attached to the optical disc D supported by the turntable 326. In other words, the peripheral portion including the flange 326a of the turntable 326 are not magnetized.

Next the mode of mounting the optical disc as well as the mode of carrying out the writing and reading operation of a disc unit with the above-described construction will be described.

In the case of mounting the optical disc D, it is displaced over the turntable 326 by a disc loading mechanism (not shown) and is placed on the peripheral upwardly extended flange 326a of the turntable 326 while inserting the shaft 320 into the center hole 301b of the disc D. Then, the magnetized regions 326b of the turntable 326 attract the attracted plates Dm of the disc D by the magnetic force so that the disc D is securely supported on the upwardly extended peripheral flange 326a of the turntable 326. Next upon energization of the motor 360, the turntable 326 is rotated so that the optical disc D is also rotated.

Meanwhile upon energization of the linear motor 314, the head carriage 312 move in the direction A or B so that the optical head 307 is displaced radially inwardly or outwardly of the surface of the optical disc D so as to be positioned over a predetermined track thereof, thereby writing and reading data onto and off of the track based on the optomagnetic recording-reproducing system.

According to this embodiment, the turntable 326 is made of a plastic magnet and therefore attracts the chuck plates Dm, thereby securely supporting the optical disc D. As a result, the thickness of the turntable 326 can be made less than a conventional turntable of the type in which the attraction magnets and their yokes are mounted on the turntable so that the disc unit can be made thinner. Furthermore, since the attraction magnets and their yokes can be eliminated, the number of component parts of the disc unit can be decreased accordingly and therefore the fabrication cost can be reduced.

Moreover, according to this embodiment, the upwardly extended peripheral flange 326a of the turntable 326 is not magnetized so that the problem caused by the attraction of magnetic particles separated from the optical disc D does not result, and therefore the problem of waving of the surface of the optical disc D can be prevented.

Furthermore according to this embodiment, the motor 360 employed is of the double rotor type in which the coils 330 are securely held in position so that overcurrent loss can be suppressed and consequently high output can be obtained even when the diameter of the motor 360 is made smaller than that of the single rotor type motor. In addition, the diameter of the motor 360 can be made sufficiently smaller than that of the innermost track of the optical disc D so that even when the motor 360 and the optical disc D are substantially equal in height and the motor 360 is moved to the end of its stroke corresponding to the position of the innermost track of the optical disc D, collision of the optical disc D with the motor 360 can be prevented. As a result, unlike the conventional disc unit of the type in which the optical head is moved over the main body of the motor at the end of its stroke, the motor 360 and the optical head 307 can be disposed at the same height as best shown in FIG. 10. Therefore the disc drive unit comprising the motor 360 and the turntable 326 can be considerably reduced in height as compared with the conventional optical disc drive unit and furthermore the height of the optical head 307 can be decreased so that it becomes possible to considerably reduce the thickness of the disc unit. In addition, the coils 330 of the motor 360 are embedded in the housing 361 so that the overall height of the motor 360 can be further decreased as compared with the conventional disc drive unit of the type in which the coils are mounted on the housing.

Next referring to FIGS. 12-16, four modifications of the disc drive unit comprising the turntable 326 and the motor 360 will be described and the same reference numerals used to designate similar parts. Furthermore the description of the common component parts which have been already explained shall not be repeated.

Figure 12:
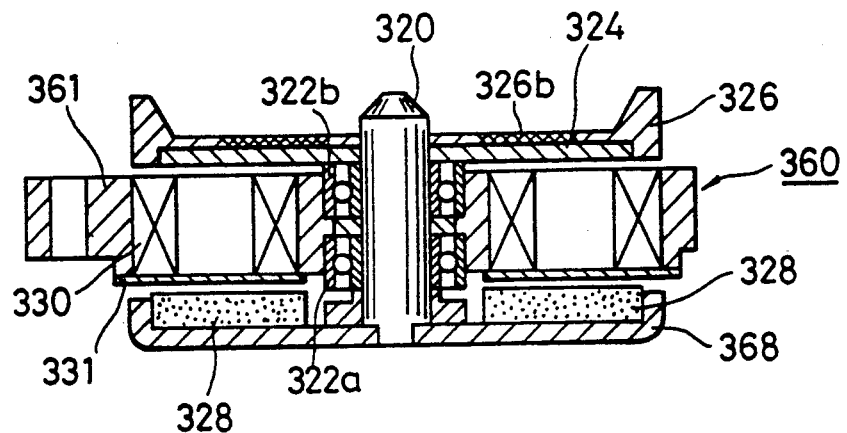
FIG. 12 is a sectional view illustrating a modification of the disc drive unit shown in FIGS. 10 and 11.

First Modification, FIG. 12

Referring first to FIG. 12, the construction of a first modification of the disc drive unit will be described. In the first modification, the magnets 328, which are component parts of the motor 360, are not mounted on the undersurface of the upper rotor 324, but are mounted on the upper surface of the lower rotor 368. With this construction, the same effects attained by the embodiment of the disc unit described above with reference to FIGS. 10 and 11 can be obtained.

Figure 13:
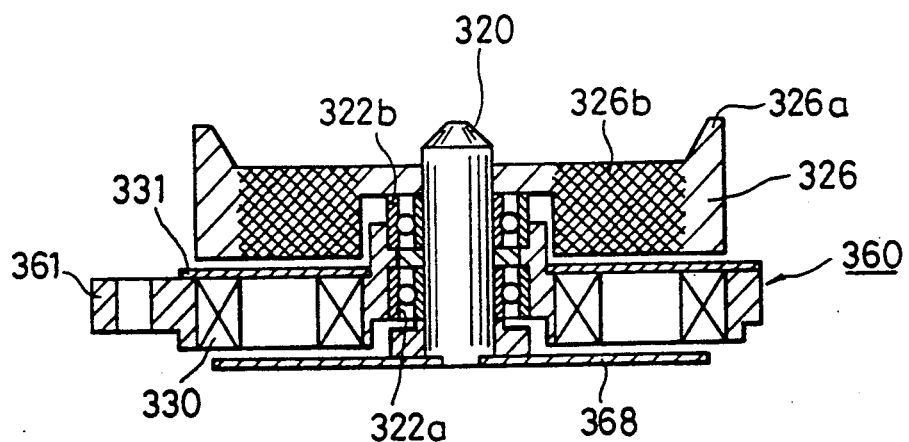
FIG. 13 is a sectional view illustrating another modification of the disc drive unit shown in FIGS. 10 and 11.

Second Modification, FIG. 13

FIG. 13 illustrates the construction of a second modification of the disc drive unit described above with reference to FIGS. 10 and 11. In the second modification, the thickness of the turntable 326 made of a plastic magnet is considerably greater than that of the turntable 326 described above with reference to FIGS. 10 and 11, its upwardly extended peripheral flange 326a and the peripheral portion in the vicinity thereof are not magnetized, but its magnetized region 326b indicated by the hatched lines is in opposing relationship with the attracted plates Dm of the optical disc D and the coils 330 through air gaps and the printed-circuit board 331.

With the above-described construction, the magnetized region 326b of the turntable 326 functions as the magnets which are the component parts of the motor 360 (that is, the magnets 328 shown in FIG. 10). In addition, since the magnetized region 326b of the turntable 326 functions as the magnets 328 of the motor 360, the whole turntable 326 also functions as the rotor of the motor 360 (that is, the rotor 324 shown in FIG. 10).

With the above-described construction, as compared with the embodiment of the disc unit described above with reference to FIGS. 10 and 11 and the first modification described above with reference to FIG. 12, the number of component parts can be decreased so that the fabrication cost can be reduced.

Figure 14:
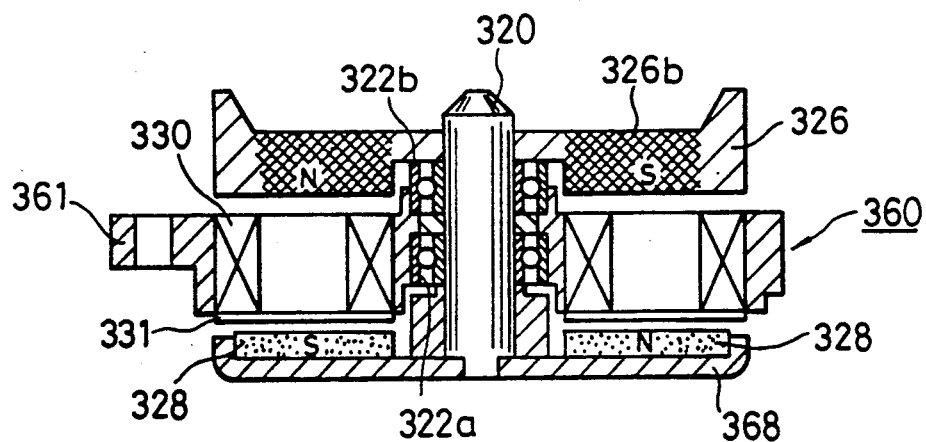
FIG. 14 is a sectional view illustrating a further modification of the disc drive unit shown in FIGS. 10 and 11.

Third Modification, FIG. 14

FIG. 14 illustrates the construction of a third modification of the disc drive unit described above with reference to FIGS. 10 and 11. In the third modification, like the first modification described above with reference to FIG. 12 and the second modification described above with reference to FIG. 13, the magnets 328 are mounted on the upper surface of the lower rotor 368 of the motor 360 and the thickness of the turntable 326 is increased so that the magnetized region 326b thereof functions as the magnet of the motor 360. It should be noted here that the magnetized regions 326b of the turntable 326 are equiangularly spaced apart from each other and alternately act as N and S poles. The magnets 328 are also equiangularly spaced apart from each other and alternately act as N and S poles. The turntable 326 is securely held in position by the shaft 320 and the magnets 328 are securely attached to the rotor 368 in such a way that the opposite magnetic poles of the magnetized regions 326b and the magnets 328 are in opposing relationship with each other.

With the above-described construction, because the opposite magnetic poles of the magnetized regions 326b and the magnets 328 are in opposing relationship, a magnetic flux stronger than that in the embodiment described above with reference to FIGS. 10 and 11 or the first and second modifications described above with reference to FIGS. 13 and 14, respectively, intersects the coils 330 so that the output of the motor 360 can be increased as compared with the above-mentioned embodiment and modifications thereof.

Figure 15:
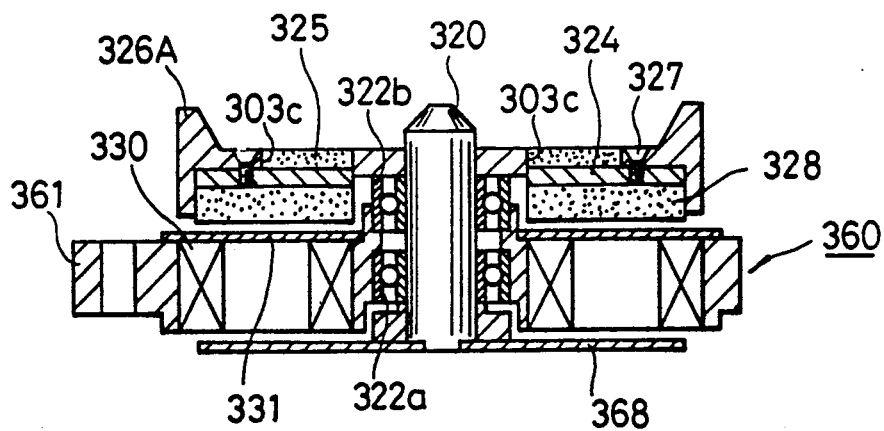
FIG. 15 is a sectional view illustrating a further modification of the disc drive unit shown in FIGS. 10 and 11.
Figure 16:
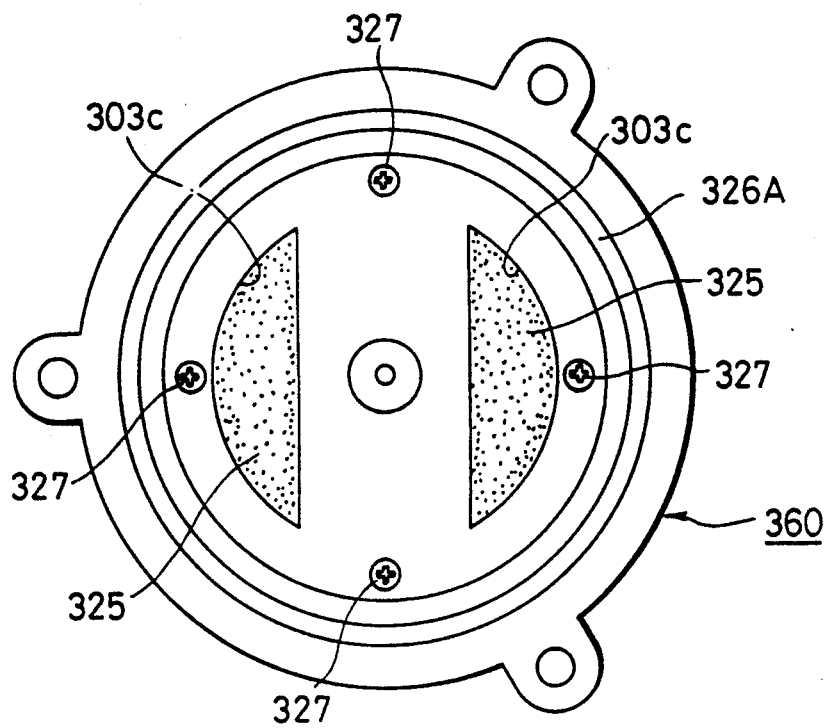
FIG. 16 is a top view of the disc drive unit shown in FIG. 15.

Fourth Modification, FIGS. 15 and 16

FIGS. 15 and 16 illustrate the construction of a fourth modification of a disc drive unit. In this modification, the turntable 326A is formed by the die-casting of nonmagnetic aluminum and has two crescent-shaped holes 303c which are in opposing relationship with the attracted plates Dm, respectively, of the optical disc D and are symmetrical with respect to the center of the turntable 326A. Magnets 325 for attracting the attracted plates Dm of the optical disc D are embedded in these holes 303c, respectively. The rotor 324 upon which are mounted the magnets 328 of the motor 360 is securely attached with screws 327 to the undersurface of the turntable 326A.

With the above-described construction, the effects of the disc unit described above with reference to FIGS. 10 and 11 and the first modification described above with reference to FIG. 12 can be attained. In addition, as compared with the turntable made of a plastic magnet, the turntable 326A formed by the die-casting of aluminum has a high degree of accuracy in size as well as a high degree of durability.

Further embodiments of the present invention include a construction in which a single attraction magnet is mounted on the yoke, that in which a single driving magnet is mounted on the yoke, that in which a single coil is mounted on the base, that in which a single portion of the turntable is magnetized.

The invention has been described in detail with respect to the embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A disc drive unit for supporting and rotating a disc comprising:
    a base member, said base member being stationary with respect to the rotation of said disc;
    a shaft fixedly secured to said base member, said shaft being stationary with respect to said base member;
    at least one coil securely attached to said base member, said coil surrounding said shaft;
    a rotary member disposed to rotate about said shaft and having
        an engagement portion in engagement with a center hole formed through said disc when said disc is mounted thereon;
        a supporting portion for supporting said disc; and
        a yoke;
    at least one attraction magnet securely mounted on one surface of said yoke in opposing relationship with said disc; and
    at least one driving magnet securedly mounted on the other surface of said yoke in opposing relationship with said at least one coil, respectively, said disc being attracted and securely held in position by a magnetic force of said at least one attraction magnet, and said rotary member being rotated by the interaction between a magnetic field produced by said at least one coil when a current is supplied to said at least one coil and a magnetic field produced by said at least one driving magnet.

2. A disc drive unit as claimed in claim 1, wherein said rotary member has bearings through which said rotary member is carried by said shaft, and wherein one of said bearings engages the hole of said disc.

3. A disc drive unit as claimed in claim 2, wherein said rotary member is an integral component, except for said bearings and said yoke.

4. A disc drive unit as claimed in claim 1, wherein said at least one attraction magnet and/or said at least one driving magnet is embedded into said rotary member.

5. A disc unit in which data are written into and/or read out from a disc for storing data comprising:
- a base member, said base member being stationary with respect to the rotation of said disc;
- a shaft fixedly secured to said base member, said shaft being stationary with respect to said base member;
- at least one coil securely attached to said base member, said coil surrounding said shaft;
- a rotary member disposed to rotate about said shaft and having
  - an engagement portion in engagement with a center hole formed through said disc when said disc is mounted thereon;
  - a supporting portion for supporting said disc; and
  - a yoke;
- at least one attraction magnet securely mounted on one surface of said yoke in opposing relationship with said disc;
- at least one driving magnet securely mounted on the other surface of said yoke in opposing relationship with said at least one coil, respectively, said disc being attracted and securely held in position by a magnetic force of said at least one attraction magnet, and said rotary member being rotated by the interaction between a magnetic field produced by said at least one coil when a current is supplied to said at least one coil and a magnetic field produced by said at least one driving magnet;
- a head for writing and/or reading out data into and/or from said disc; and
- a head driving means for displacing said head along a surface of said disc, said data being written into and/or read out from said disc by the rotation of said disc by said disc drive unit and the displacement of said head.

6. A disc drive unit for supporting and rotating a disc comprising:
- a base member, said base member being stationary with respect to the rotation of said disc;
- a shaft rotatably attached to said base member;
- at least one coil securely mounted on said base member, said coil surrounding said shaft;
- a rotary member securely carried by said shaft, said rotary member having a supporting portion for supporting said disc;
- a yoke, said yoke being a component part of said rotary member;
- at least one attraction magnet mounted on one surface of said yoke in opposing relationship with said disc; and
- at least one driving magnet mounted on the other surface of said yoke in opposing relationship with said at least one coil, respectively, said disc being attracted and securely held in position by a magnetic force of said at least one attraction magnet, and said rotary member being rotated by the interaction between a magnetic field produced by said at least one coil when a current is supplied to said at least one coil and a magnetic field produced by said at least one driving magnet.

7. A disc drive unit as claimed in claim 6, wherein said rotary member is carried by said shaft through bearings.

8. A disc drive unit as claimed in claim 7, wherein said rotary member is an integral component except for said bearings and said yoke.

9. A disc in which data are written into and/or read out from a disc used for storing data comprising:
- a base member, said base member being stationary with respect to the rotation of said disc;
- a shaft rotatably attached to said base member;
- at least one coil securely mounted on said base member, said coil surrounding said shaft;
- a rotary member securely carried by said shaft, said rotary member having a supporting portion for supporting said disc;
- a yoke, said yoke being a component part of said rotary member;
- at least one attraction magnet mounted on one surface of said yoke in opposing relationship with said disc;
- at least one driving magnet mounted on the other surface of said yoke in opposing relationship with said at least one coil, respectively, said disc being attracted and securely held in position by a magnetic force of said at least one attraction magnet, and said rotary member being rotated by the interaction between a magnetic field produced by said at least one coil when a current is supplied to said at least one coil and a magnetic field produced by said at least one driving magnet;
- a head for writing and reading data onto and off of said disc; and
- a head driving means for displacing said head along a surface of said disc; said data being written into and/or read out from said disc by the rotation of said disc by said disc driving unit and the displacement of said head.

10. A disc drive unit for supporting and rotating a disc comprising:
- a base member, said base member being stationary with respect to the rotation of said disc;
- a shaft rotatably attached to said base member;
- at least one coil securely mounted on said base member, said coil surrounding said shaft;
- a rotary member made of a plastic which contains a magnetizable material, said rotary member being securely carried by said shaft and having a supporting portion for supporting said disc;
- at least one attraction magnet region of said rotary member, said attraction magnet region being defined by partially magnetizing at least one region of one surface of said rotary member in opposing relationship with said disc; and
- at least one driving magnet region of said rotary member, said driving magnet region being defined by partially magnetizing at least one region on the other surface of said rotary member in opposing relationship with said at least one coil, said disc being attracted and securely held in position by a magnetic force of said at least one attraction magnet region, and said rotary member being rotated by an interaction between a magnetic field produced by said at least one coil when a current is supplied to said at least one coil and a magnetic field produced by said at least one driving magnet region.

11. A disc drive unit as claimed in claim 10, wherein a portion of said base member for engagement with said shaft is extended to a recess formed in said rotary member.

12. A disc unit in which data are written and read onto and off of a disc used for the storage of data comprising:
- a base member, said base member being stationary with respect to the rotation of said disc;
- a shaft rotatably attached to said base member;

at least one coil securely mounted on said base member, said coil surrounding said shaft;

a rotary member made of a plastic which contains a magnetizable material, said rotary member being securely carried by said shaft and having a supporting portion for supporting said disc;

at least one attraction magnet region of said rotary member, said attraction magnet region being defined by partially magnetizing at least one region of one surface of said rotary member in opposing relationship with said disc;

at least one driving magnet region of said rotary member, said driving magnet region being defined by partially magnetizing at least one region on the other surface of said rotary member in opposing relationship with said at least one coil, said disc being attracted and securely held in position by a magnetic force of said at least one attraction magnet region, and said rotary member being rotated by an interaction between a magnetic field produced by said at least one coil when a current is supplied to said at least one coil and a magnetic field produced by said at least one driving magnet region;

a head for writing and/or reading out data into and/or from said disc; and a head driving means for displacing said head along a surface of said disc, said data being written into and/or read out from said disc by the rotation of said disc by said disc drive unit and the displacement of said head.

13. A disc drive unit for supporting and rotating a disc comprising:

a base member, said base member being stationary with respect to the rotation of said disc;

a shaft rotatably attached to said base member;

at least one coil securely mounted on said base member, said coil surrounding said shaft;

a rotary member made of a plastic which contains a magnetizable material, said rotary member being securely carried by said shaft and having a supporting portion for supporting said disc;

at least one attraction magnet region of said rotary member, said attraction magnet region being defined by partially magnetizing at least one region of said surface of said rotary member in opposing relationship with said disc; and at least one driving magnet mounted on the other surface of said rotary member in opposing relationship with said at least one coil, said disc being attracted and securely held in position by a magnetic force of said at least one attraction magnet region, and said rotary member being rotated by an interaction between a magnetic field produced by said at least one coil when a current is supplied to said at least one coil and a magnetic field produced by said at least one driving magnet.

14. A disc drive unit as claimed in claim 13, wherein said rotary member has a first rotary member made of a plastic which contains a magnetizable material, said first rotary member having said supporting portion and said at least one attraction magnet region; and a second rotary member upon which are securely mounted said driving magnets.

15. A disc drive unit as claimed in claim 14, wherein said first rotary member has at least one driving magnet region defined by partially magnetizing at least one region of said first rotary member.

16. A disc unit in which data are written into and/or read out from a disc used for storing data comprising:

a base member, said base member being stationary with respect to the rotation of said disc;

a shaft rotatably attached to said base member;

at least one coil securely mounted on said base member, said coil surrounding said shaft;

a rotary member made of a plastic which contains a magnetizable material, said rotary member being securely carried by said shaft and having a supporting portion for supporting said disc;

at least one attraction magnet region of said rotary member, said attraction magnet region being defined by partially magnetizing at least one region of one surface of said rotary member in opposing relationship with said disc;

at least one driving magnet mounted on the other surface of said rotary member in opposing relationship with said at least one coil, said disc being attracted and securely held in position by a magnetic force of said at least one attraction magnet region, and said rotary member being rotated by an interaction between a magnetic field produced by said at least one coil when a current is supplied to said at least one coil and a magnetic field produced by said at least one driving magnet;

a head for writing and/or reading out data into and/or from said disc; and a head driving means for displacing said head along a surface of said disc, said data being written into and/or read out into and/or from said disc by the rotation of said disc by said disc drive unit and the displacement of said head.

* * * * *